US009167936B2

(12) United States Patent
Caswell

(10) Patent No.: US 9,167,936 B2
(45) Date of Patent: Oct. 27, 2015

(54) FLUID MIXING APPARATUS AND METHODS

(75) Inventor: Michael R. Caswell, New York, NY (US)

(73) Assignee: ROASTING PLANT, INC., New York, NY (US)

( * ) Notice: Subject to any disclaimer, the term of this patent is extended or adjusted under 35 U.S.C. 154(b) by 1634 days.

(21) Appl. No.: 11/699,979

(22) Filed: Jan. 30, 2007

(65) Prior Publication Data

US 2008/0181985 A1     Jul. 31, 2008

(51) Int. Cl.
A47J 31/44 (2006.01)
A23C 17/00 (2006.01)

(52) U.S. Cl.
CPC .................................. *A47J 31/4485* (2013.01)

(58) Field of Classification Search
CPC ...................................................... A47J 31/4485
USPC ........ 99/280, 300, 293–294, 301, 305, 323.3, 99/323.11, 323.1, 316, 281, 286–288, 99/289 D, 290; 426/42, 580, 34, 45, 59, 426/564, 593–596, 432–435, 442
See application file for complete search history.

(56) References Cited

U.S. PATENT DOCUMENTS

| 3,961,570 | A | * | 6/1976 | Sanden | 99/452 |
| 4,144,804 | A | * | 3/1979 | O'Keefe et al. | 99/452 |
| 5,116,632 | A | * | 5/1992 | Miller | 426/597 |
| 6,019,032 | A |   | 2/2000 | Arksey | |
| 6,866,877 | B2 |  | 3/2005 | Clark et al. | |
| 6,887,505 | B2 | * | 5/2005 | Reaves et al. | 426/115 |
| 6,959,642 | B1 | * | 11/2005 | Landolt | 99/455 |
| 7,021,206 | B2 | * | 4/2006 | Eckenhausen et al. | 99/452 |
| 2004/0084478 | A1 | * | 5/2004 | Floyd et al. | 222/135 |
| 2005/0095341 | A1 | * | 5/2005 | Sher et al. | 426/594 |
| 2006/0034987 | A1 | * | 2/2006 | Thakur et al. | 426/477 |
| 2006/0191420 | A1 | * | 8/2006 | Mazzola et al. | 99/287 |
| 2006/0222736 | A1 | * | 10/2006 | Keller | 426/45 |
| 2006/0286262 | A1 |   | 12/2006 | Stearns et al. | |

FOREIGN PATENT DOCUMENTS

JP     2002140761 A  *  5/2002  ............. G07F 13/00

OTHER PUBLICATIONS

JP_2002140761_machine_translation.pdf.*
International Search Report and Written Opinion for Application No. PCT/US08/01121, dated Jul. 18, 2008.
International Preliminary Report on Patentability for Application No. PCT/US08/01121, dated Aug. 13, 2009.

* cited by examiner

*Primary Examiner* — Dana Ross
*Assistant Examiner* — Ket D Dang
(74) *Attorney, Agent, or Firm* — McCarter & English, LLP; David R. Burns

(57) ABSTRACT

Apparatus and methods are provided for making a beverage or providing a liquid. First and second liquids may be mixed to form a mixed liquid. The mixed liquid may be passed through a frothing head and/or may be combined with a coffee product and optionally dispensed into a cup. Examples of first and second liquids can include, but are not limited to various dairy products, enzymes and flavoring liquids. According to one example implementation, a first liquid is a reduced fat milk, such as skim milk, and a second liquid is whole milk, thereby enabling the creation of dairy product varieties including one percent and two percent milk to be created by the appropriate mixture combination of the skim milk and whole milk.

12 Claims, 6 Drawing Sheets

FLUID MIXING APPARATUS AND METHODS

FIELD OF THE INVENTION

This invention relates broadly to the beverage industry. More particularly, this invention relates to apparatus and methods for the mixing of multiple liquids.

BACKGROUND

The production of beverage milks combines the operations of clarification, separation for the production of lower fat milks, pasteurization, and homogenization. While the fat content of most raw milk is 4% or higher, the fat content in most beverage milks has been reduced to 3.4%. Lower fat alternatives, such as 2% fat, 1% fat, or skim milk (<0.1% fat) are also available in most markets. These products are either produced by partially skimming the whole milk, or by completely skimming it and then adding an appropriate amount of cream back to achieve the desired final fat content.

Milk is a major ingredient in espresso and cocoa-based gourmet beverages, specifically cappuccino, mocha, hot cocoa, and latte beverages, both hot and iced. One method for producing cappuccino and latte beverages is through the use of super-automated brewing equipment. These machines come equipped as two-step or one-step machines, referring to the number of steps required by the operator to produce the milk/espresso beverage. Two-step machines require the operator to first hand steam the milk component and then combine the milk with espresso that is produced automatically by the machine or with cocoa. One-step machines automatically steam and combine the milk component with automatically produced espresso.

A major limitation of existing available one-step machines is the variety of milk that is available to the consumer. Machines currently available can only handle one milk variety due to limitations in milk storage, plumbing, and recipe programming capacity.

In the North American market in particular this creates a problem and major limitation for the commercial viability of these one-step machines because the educated coffee consumer has become accustomed to choosing between, skim, 1%, 2%, and whole (3.4%) milk. Retailers typically steam milk by hand in order to offer this variety of milk to their customers. This results in slower customer service, product inconsistency and more milk waste.

SUMMARY

Various embodiments of the present invention can address some of the deficiencies of the art and are usable with many types of brewing equipment. Examples of the present invention may be used in a wide variety of applications to provide an ability to automatically mix fluids, including dairy products, in order to provide a desired fluid as an additive to a beverage.

Various embodiments of the invention may provide methods or apparatus for providing a beverage and/or addition to a beverage. According to an illustrative embodiment of the invention, an apparatus provides a liquid. In this embodiment, the apparatus includes a water input; a first liquid input in fluid communication with a first liquid storage; a second liquid input in fluid communication with a second liquid storage; a mixing chamber in fluid communication with the first liquid input and second liquid input and adapted to provide a mixture of the first liquid and the second liquid; and a frothing head in fluid communication with the mixing chamber, the frothing head adapted to receive the mixture; wherein the water input is in fluid communication with a dispenser and the dispenser and the frothing head are configured to output into a liquid container.

In another illustrative embodiment of the invention, an apparatus for providing a liquid includes a frothing head; a first liquid pump having a first output coupled to the frothing head and having a first input coupled to a first refrigerated liquid container; and a second liquid pump having a second output coupled to the frothing head and having a second input coupled to a second refrigerated liquid container.

According to one illustrative embodiment of the invention, an apparatus for providing a beverage includes a brewing chamber configured to receive coffee grounds and water and to output coffee; a mixing chamber in fluid communication with a first liquid input and a second liquid input and adapted to output a mixture of the first liquid and the second liquid; and a beverage container region having at least one element defining a border of the region, wherein the mixing chamber is in fluid communication with the beverage container region to dispense the mixture into the beverage container region and wherein the brewing chamber is in fluid communication with the beverage container region to dispense the coffee into the beverage container region.

According to one illustrative embodiment of the invention, a method of making a beverage includes the acts of obtaining a first liquid dairy product; obtaining a second liquid dairy product; receiving an instruction to specify a mixture of the first liquid dairy product and the second liquid dairy product; automatically mixing the first liquid dairy product and the second liquid dairy product to form a mixed dairy product; dispensing the mixed diary product into a cup; and dispensing a coffee product into the cup.

A method of making a beverage includes receiving an instruction to specify a mixture of a first liquid dairy product and an enzyme; mixing the first liquid dairy product and the enzyme according to the instruction; dispensing the mixed first liquid diary product and the enzyme into a cup; and dispensing a coffee product into the cup.

A further method of making a beverage according to another illustrative embodiment of the invention includes receiving an instruction to specify a mixture of a first liquid dairy product and a flavoring liquid; mixing the first liquid dairy product and the flavoring liquid according to the instruction; dispensing the mixed first liquid diary product and the flavoring liquid into a cup; and dispensing a coffee product into the cup.

DETAILED DESCRIPTION

According to various embodiments of this invention, methods and devices are provided for making a beverage and/or providing a liquid. First and second liquids may be mixed to form a mixed liquid. The mixed liquid may be passed through a frothing head and/or may be combined with a coffee product and optionally dispensed into a cup. Examples of first and second liquids can include, but are not limited to various dairy products, enzymes and flavoring liquids. According to an example implementation, a first liquid is a reduced fat milk, such as skim milk, and a second liquid is whole milk, thereby enabling the creation of dairy product varieties including one percent and two percent milk to be created by the appropriate mixture combination of the skim milk and whole milk.

Figure 1:
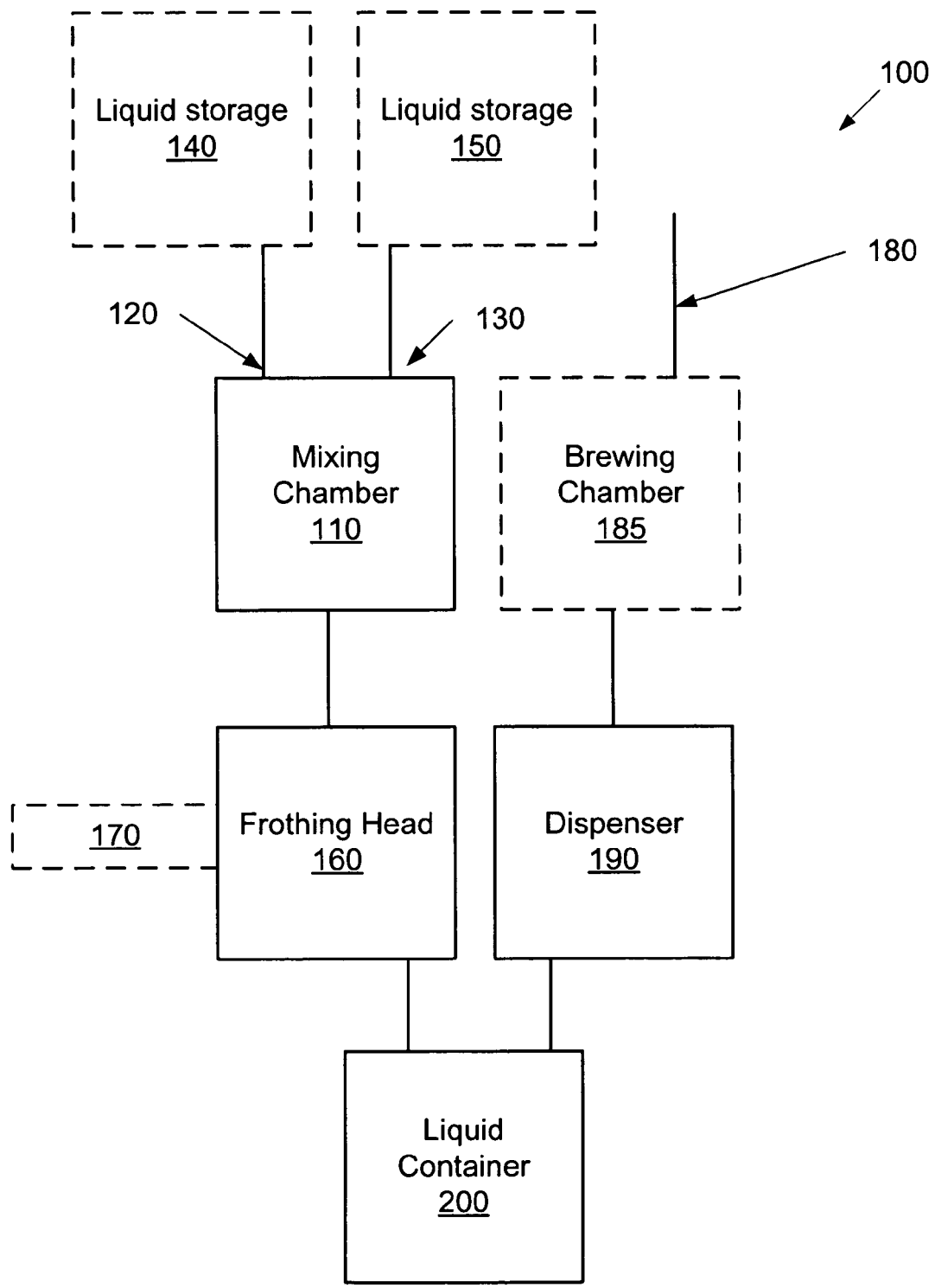
FIG. 1 is a schematic illustration of a first embodiment of an apparatus for providing a liquid according to an embodiment of the invention.

An illustrative embodiment of the invention is provided in FIG. 1. The apparatus 100 for providing liquid includes a mixing chamber 110 having a first liquid input 120 and a second liquid input 130. The first liquid input 120 is in fluid communication with a first liquid storage 140 and the second liquid input 130 is in communication with a second liquid storage 150. The mixing chamber 110 is configured to output a mixture of the first liquid and the second liquid. It is understood that the output of the mixing chamber 110 may not be fully mixed so as to be uniform mixture of the first liquid and second liquid, although further mixture of the fluids may occur in a frothing head 160 and/or a liquid container 200. Alternatively, the mixing chamber 110 may provide a thoroughly mixed output.

The output of the mixing chamber 110 is coupled to the frothing head 160 that is configured to froth the output of the mixing chamber. Frothing of the output may be performed in a wide variety of ways known in the art, including the injection of air into the fluid passing through the frothing head. Optionally, a heating element 170 may be provided proximate to the frothing head to heat the output of the mixing chamber 110. A water input 180 is also provided with the apparatus 100. The water input 180 is in fluid communication with a dispenser 190. Both the dispenser 190 and the frothing head 160 are configured to output into the liquid container 200. The invention can be used with a wide variety of liquid containers 200, such as for example, a coffee mug, a pitcher, a vat and/or a bucket.

Optionally, a brewing chamber 185 may be provided in fluid communication with the water input 180 and the dispenser 190. The brewing chamber 185 may be used to brew a beverage such as coffee. Brewing methods can include, but are not limited to, percolation, French press, espresso, drip, cold and vacuum brewing.

The first liquid storage 140 and second liquid storage 150 may be refrigerated and may be used to store a wide variety of liquids. Examples of liquids can include, but are not limited to dairy products such as reduced fat milk, skim milk, one percent milk, two percent milk, whole milk and heavy cream. Other examples of fluids can include a flavorizing liquid that can be used to provide a flavor to the output of the mixing chamber 110. Another example of a fluid for use in the first liquid storage 140 or second liquid storage 150 is an enzyme.

Examples of enzymes can include, but are not limited to, enzymes to enable digestion of milk by a lactose-intolerant person. In one example, the enzyme can break down at least some of the lactose in the milk to create a digestible sugar, as is understood in the art.

Various embodiments of the invention can provide a liquid mixing capability that can enable the delivery of any milk fat percentage in any size beverage, by the cup, and on-demand, including while utilizing one-step super automated brewing equipment, such as, but not limited to, the Egro 50 Series super-automated brewing system. This milk handling strategy can be provided with an ability to store the milk in connection with the automated brewing equipment or may utilize a separate milk storage system, such as a separate refrigerator.

By utilizing two milks, such as, for example a reduced fat milk, such as, for example skim (<0.1% fat), and whole (3.4% fat), and combining them in various proportions as they enter the one or more frothing heads, the creation of unlimited permutations of delivered milk fat content is provided, in any beverage size, to the final beverage cup.

Figure 2:
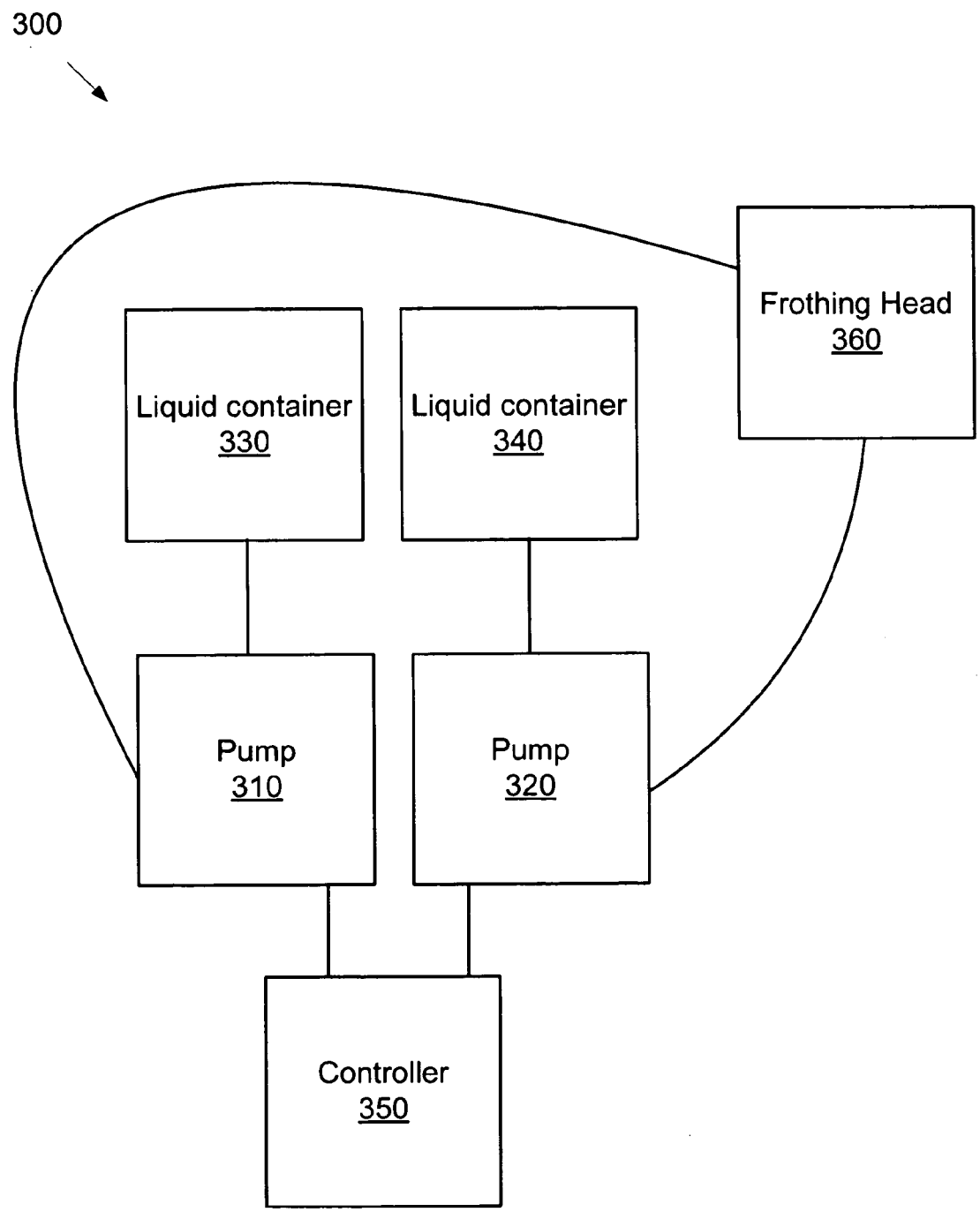
FIG. 2 is a schematic illustration of an apparatus for providing a liquid according to a further illustrative embodiment of the invention.

According to a second illustrative embodiment of the invention, an apparatus 300 may provide a liquid. The apparatus 300 is illustrated by way of example in FIG. 2. The apparatus 300 includes a first liquid pump 310 and a second liquid pump 320. Each of the liquid pumps 310, 320 is configured to have a liquid input coupled to a refrigerated liquid container. The first pump 310 has a liquid input coupled to a first refrigerated liquid container 330, while the second pump 320 has a input coupled to a second refrigerated liquid container 340. A controller 350 is provided to control the timing and rate of operation of each of the pumps 310, 320. The pumps 310, 320 are configured to output to a frothing head 360. By use of the controller 350, the first pump 310 and/or second pump 320 may be activated to provide a desired mixture of a liquid contained in the first refrigerated liquid container 330 and the liquid contained in the second refrigerated liquid container 340. According to one example implementation of the invention, skim milk may be located in the first refrigerated liquid container 330 and whole milk may be located in the second refrigerated liquid container 340. In another example implementation of the invention, a dairy product may be located in the first refrigerated liquid container 330 and an enzyme may be located in the second refrigerated liquid container 340.

By enabling the independent but simultaneous control of each pump 310, 320, milk can be combined in a range from 100% of a first fluid, such as skim milk to 100% of a second fluid, such as whole milk, or any mixture of the two. By way of illustration, if a customer orders a whole milk latte, the recipe can include instructions to activate only the pump connected to the liquid container having whole milk, thereby delivering 100% whole milk to the frothing head(s) and, eventually, beverage cup. If the customer orders a 2% milk latte, then the recipe instructions will include signals to drive both pumps 310, 320 in a manner that delivers the appropriate percentage of each milk so that when combined at the frothing head(s) the resulting steamed or cold milk contains 2% milk fat.

For 1% milk orders the recipes would specify 29% by volume whole milk, and 71% by volume nonfat milk, yielding 1% milk fat content in the cup. Similarly the system could deliver milk at 0.5%, 1.5%, or 2.5% or any other % in between 0% and 3.4% by programming the appropriate ratio. Also, should a higher milk fat content be desired the whole milk ingredient could be replace by half & half, light cream, heavy cream etc. and the associated milk fat % would be calculated in order to deliver the correct final milk fat content (4,5,6% etc.) in the beverage. For skim milk orders, the recipe will include instructions to activate only the pump connected to the liquid container having skim milk, thereby delivering 100% skim milk to the frothing head(s) and beverage cup.

Figure 3:
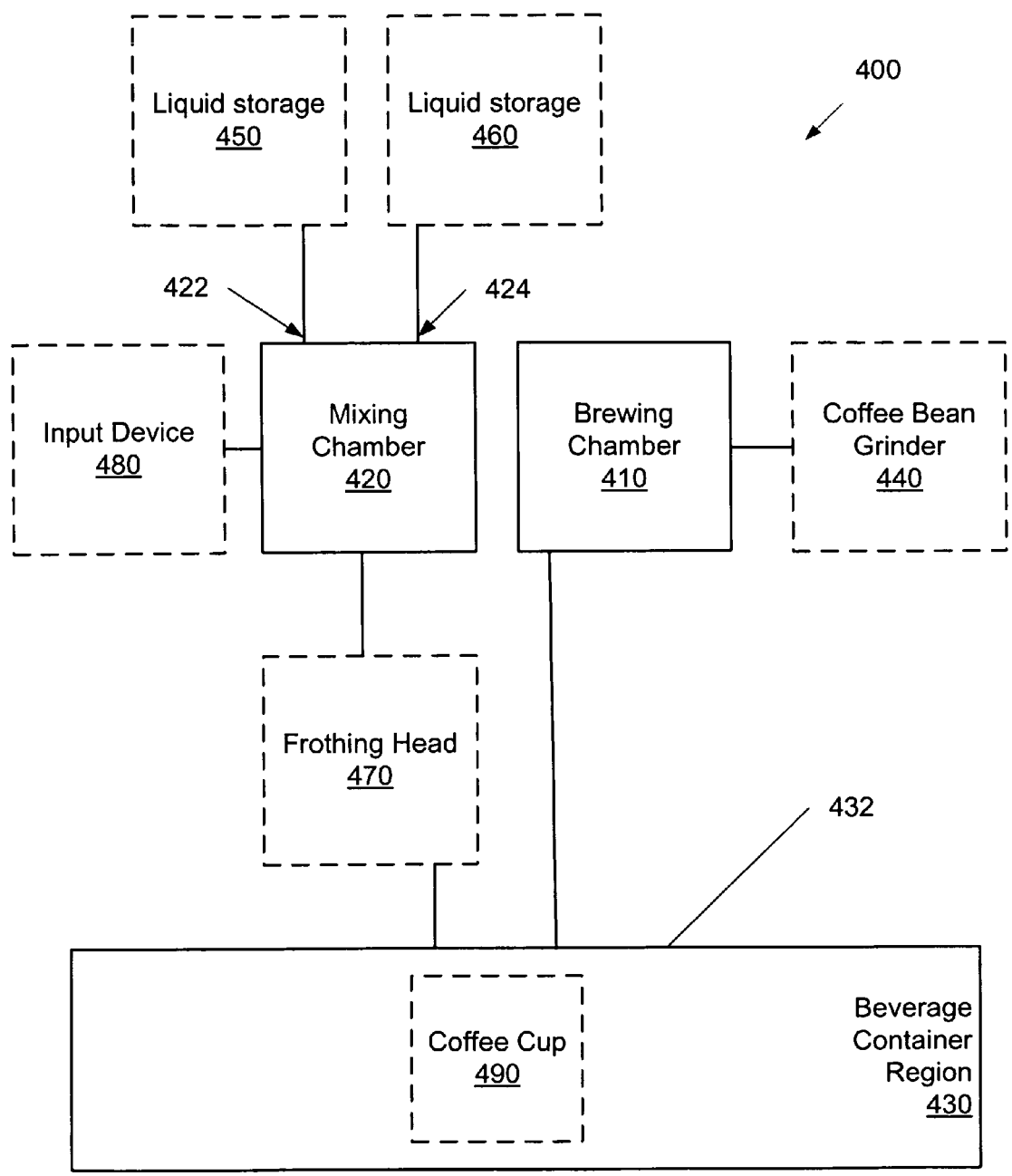
FIG. 3 illustrates an apparatus for providing a beverage according to a further illustrative embodiment of the invention.

According to a third example embodiment of the invention, an apparatus 400 for providing a beverage may be provided as illustrated by way of example in FIG. 3. A brewing chamber 410 is configured to receive coffee grounds and water and to output coffee. A mixing chamber 420 is in fluid communication with a first liquid input 422 and a second liquid input 424 and can output a mixture of the first liquid and second liquid.

A beverage container region 430 is also provided having at least one element 432 defining a border of the region 430. The mixing chamber 420 is in fluid communication with the beverage container region 430 to dispense a mixture of the first liquid and second liquid into the beverage container region 430. The brewing chamber 410 is in fluid communication with the beverage container region 430 to dispense the coffee into the beverage container region 430.

Optionally, a coffee bean grinder 440 may be provided to grind coffee beans and provide the coffee grounds to the brewing chamber 410. Also optionally, a first and/or second refrigerated liquid storage 450, 460 may be provided in fluid communication with the first liquid input 422 and second liquid input 424, respectively, of the mixing chamber 420. Optionally, a frothing head 470 may be provided in fluid communication with the mixing chamber 420 and the beverage container region 430 so as to froth an output of the mixing chamber 420. Optionally, an input device 480 may be provided to receive an instruction to specify a desired mixture of the first liquid and second liquid.

A wide variety of fluids may be stored in the first and second refrigerated liquid storage 450, 460. Examples include, but are not limited to skim milk, one percent milk, two percent milk, whole milk, heavy cream, an enzyme and a flavoring liquid. According to an example implementation of the invention, the input device 480 may receive an instruction to mix two percent milk. The first refrigerated liquid storage 450 may have skim milk located therein, and the second refrigerated liquid storage 460 may have whole milk located therein. By an appropriate mixture of the skim milk and whole milk, the desired two percent milk may be mixed by the mixing chamber 420 and therefore output to the beverage container region 430.

An element 432 of the beverage container region 430 may include a sidewall, base plate, top plate, one or more posts and/or a marking so as to define at least a portion of a border of the beverage container region 430. The beverage container region 430 is intended to receive and optionally store a beverage container, thereby locating the beverage container 490, such as a coffee cup, to receive the output of the brewing chamber 410 and mixing chamber 420, optionally through the frothing head 470.

By way of example, in operation, if the input device 480 receives instructions for a 16 oz latte beverage, the recipe could specify 2 oz of espresso, and 14 oz of milk. In order to deliver 14 oz of 2% milk, the recipe could specify the delivery of 8.24 oz (59% by volume) whole milk and 5.76 oz (41% by volume) skim. For larger and smaller 2% milk drinks, the milk volumes would be adjusted utilizing the 59/41% ratio.

Figure 4:
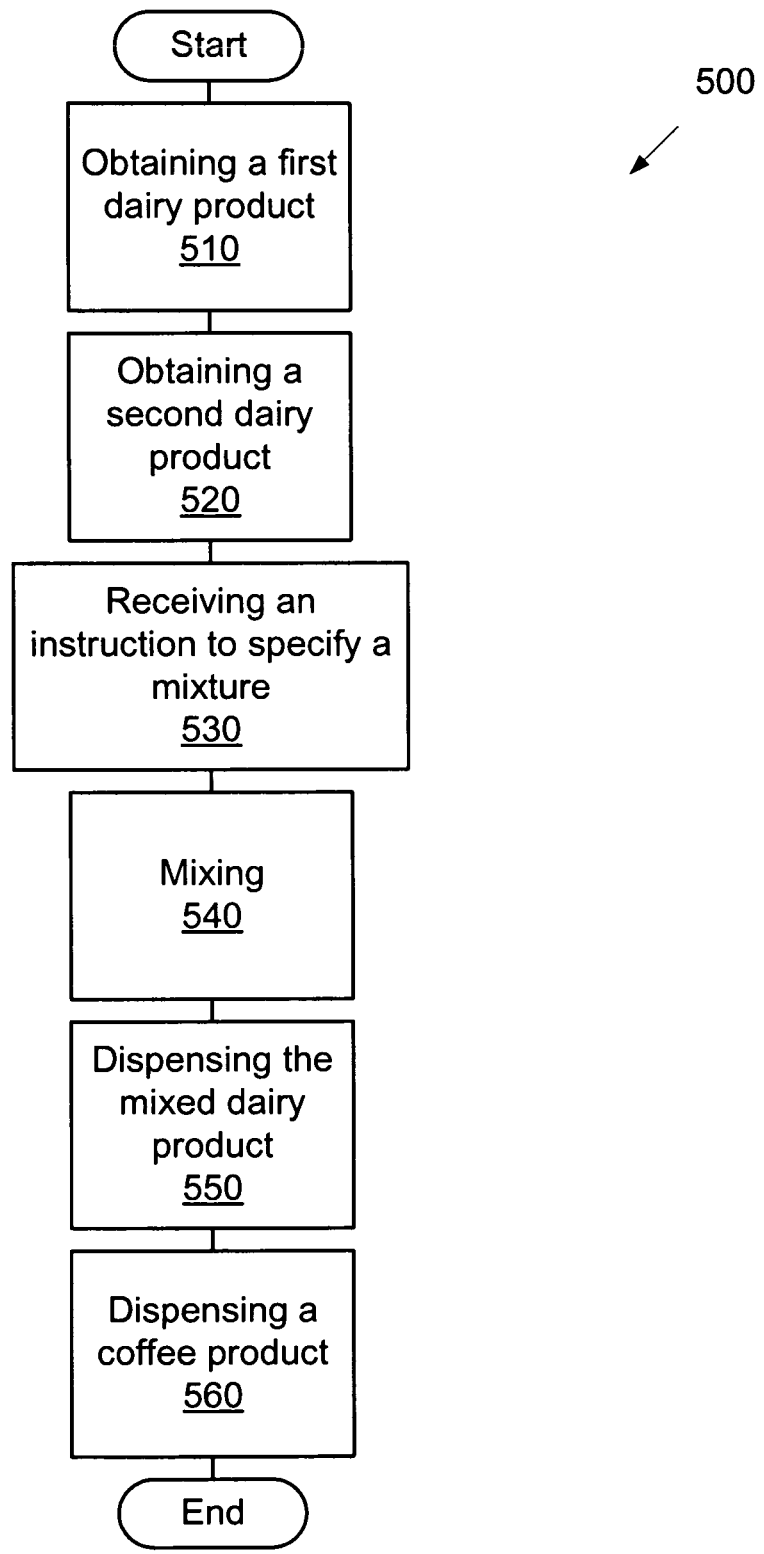
FIGS. 4 through 6 provide example flowchart illustrations of various methods of making a beverage according to further example embodiments of the invention.

According to a further example embodiment of the invention, a method of making a beverage is provided as illustrated by way of example in FIG. 4. The method 500 includes obtaining 510 a first liquid dairy product and obtaining 520 a second liquid dairy product. Examples of liquid dairy products include, but are not limited to reduced fat milk, skim milk, one percent milk, two percent milk, whole milk and heavy cream. An instruction is received 530 to specify a mixture of the first liquid dairy product and the second liquid dairy product. The first liquid dairy product and second liquid dairy product are automatically mixed 540 to form a mixed dairy product. The mixed dairy product is dispensed 550 into a cup. The coffee product is also dispensed 560 into the cup. Optionally, the mixed dairy product may be heated prior to dispensing 550 the mixed dairy product into the cup. Optionally, steam may be injected into the mixed dairy product prior to dispensing 550 the mixed dairy product into the cup.

Figure 5:
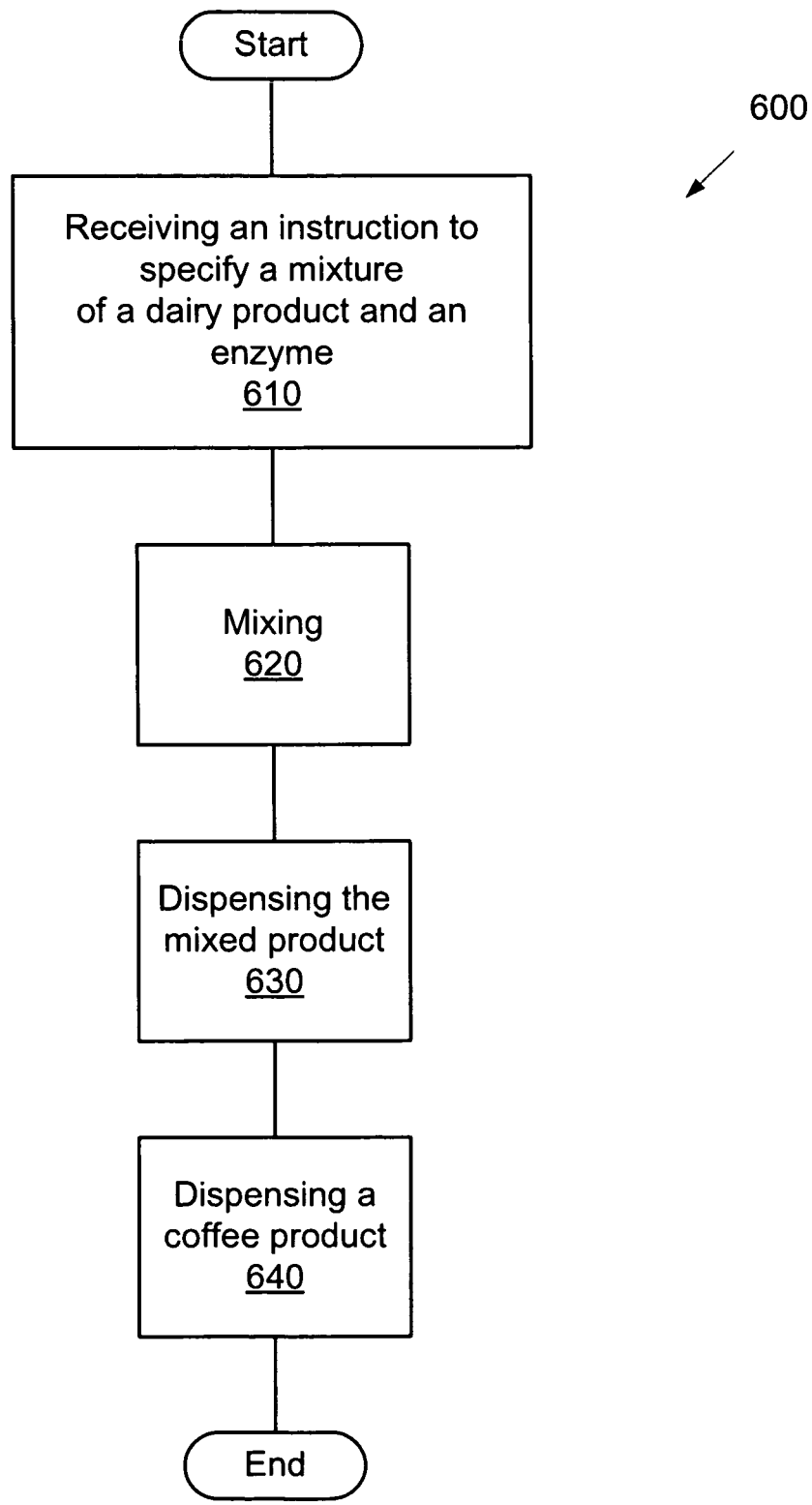

A further example embodiment of the invention is a method 600 of making a beverage as illustrated by way of example in FIG. 5. The method includes receiving 610 an instruction to specify a mixture of a first liquid dairy product and an enzyme. The first liquid dairy product and enzyme are mixed 620 according to the instruction. The mixed first liquid dairy product and the enzyme are dispensed 630 into a cup. Also, a coffee produce is dispensed 640 into the cup. Optionally, a second liquid dairy product may be mixed with the first liquid dairy product and/or the enzyme. In such a case, dispensing 630 the mixed first liquid dairy product and the enzyme into the cup also includes dispensing the mixed second liquid dairy product.

Figure 6:
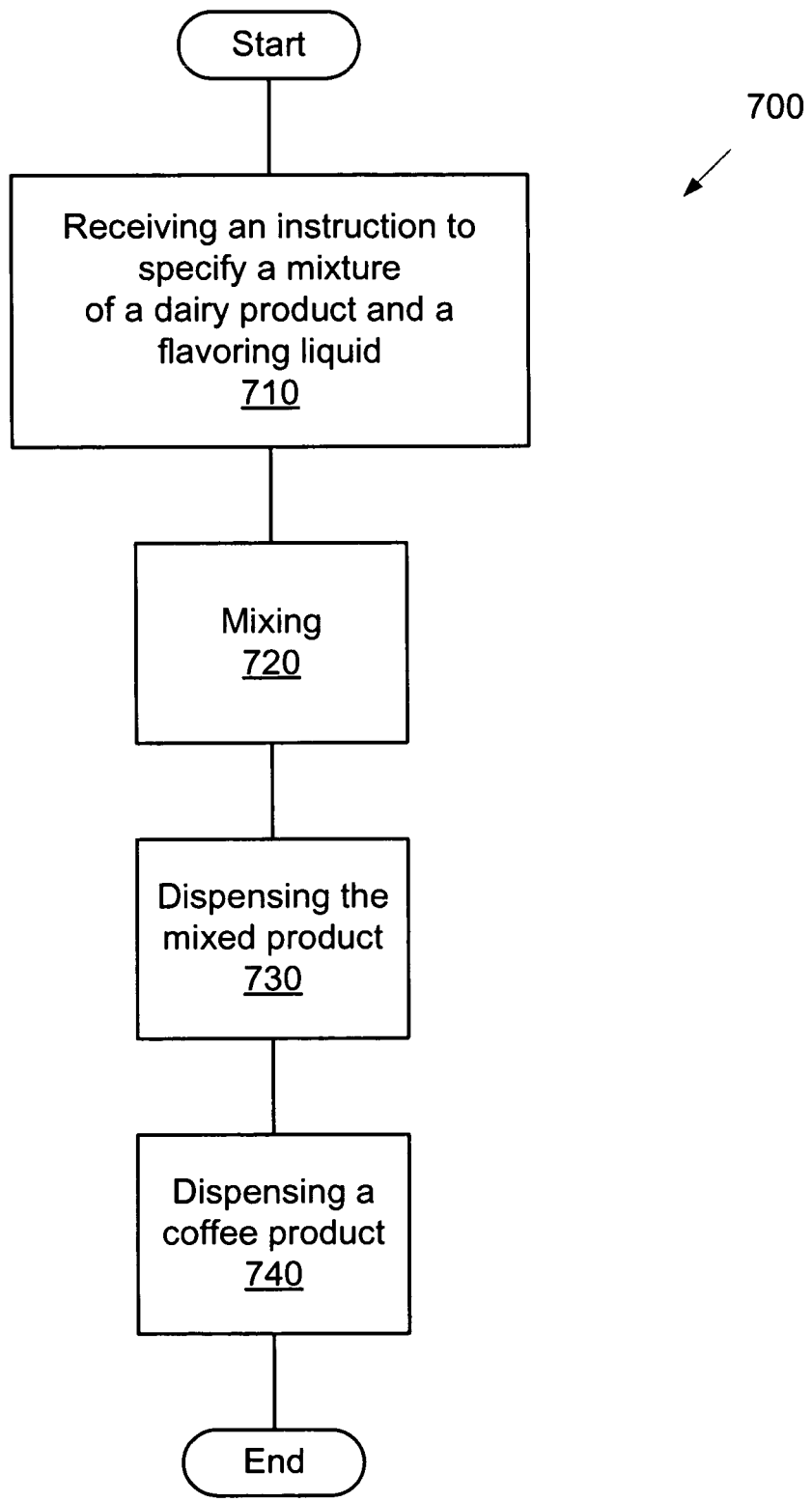

According to a further exemplary embodiment of the invention, a method 700 is provided by way of example in FIG. 6. The method 700 is a method of making a beverage and includes receiving 710 an instruction to specify a mixture of a first liquid dairy product and a flavoring liquid. The first liquid dairy product and the flavoring liquid are mixed 720 according to the instruction. The mixed first liquid dairy product and the flavoring liquid are dispensed 730 into a cup. Also, a coffee product is dispensed 740 into the cup. Optionally, a second liquid dairy product may be mixed with the first liquid dairy product and/or the flavoring liquid. In such an implementation, dispensing 730 the mixed first liquid dairy product and the flavoring liquid into the cup also includes dispensing the mixed second liquid dairy product.

The illustrative embodiments, implementations and examples herein are meant to be illustrative and not limiting. The present invention has been described by way of example, and modifications and variations of the exemplary embodiments will suggest themselves to skilled artisans in this field without departing from the spirit of the invention. Features and characteristics of the above-described embodiments may be used in combination. The preferred embodiments are merely illustrative and should not be considered restrictive in any way.

What is claimed is:
1. An apparatus for providing a beverage, comprising:
a brewing chamber configured to receive coffee grounds and water and to output coffee;
an input device for receiving instructions, thereby specifying a first desired volume of a first liquid and a second desired volume of a second liquid in accordance with a desired fat content of a resulting liquid mixture;
a mixing chamber in fluid communication with the first liquid and the second liquid and adapted to output the liquid mixture of the first desired volume of the first liquid and the second desired volume of the second liquid combined such that the liquid mixture has the desired fat content; and
a beverage container region having at least one element defining a border of the beverage container region;
wherein the mixing chamber is in fluid communication with the beverage container region to dispense the liquid mixture into the beverage container region;
wherein the brewing chamber is in fluid communication with the beverage container region to dispense coffee into the beverage container region; and
wherein the brewing chamber and the mixing chamber are configured to dispense the coffee and the liquid mixture, respectively, into the beverage container region.
2. The apparatus of claim 1, further comprising a coffee bean grinder configured to grind coffee beans and provide the coffee grounds to the brewing chamber.

3. The apparatus of claim 1, further comprising:
a first refrigerated liquid storage in fluid communication with the first liquid input; and
a second refrigerated liquid storage in fluid communication with the second liquid input.

4. The apparatus of claim 1, further comprising a frothing head in fluid communication between the mixing chamber and the beverage container region.

5. The apparatus of claim 1, further comprising an input device to receive an instruction to specify a proportion of the first liquid to the second liquid to be output by the mixing chamber.

6. The apparatus of claim 1, further comprising skim milk in the first liquid storage.

7. The apparatus of claim 1, further comprising whole milk in the first liquid storage.

8. The apparatus of claim 1, further comprising an enzyme in the first liquid storage.

9. The apparatus of claim 1, further comprising a flavoring liquid in the first liquid storage.

10. The apparatus of claim 1, further comprising a coffee cup located in the beverage container region.

11. The apparatus of claim 1:
wherein the first liquid includes a reduced fat dairy product and the second liquid includes a whole fat dairy product, and wherein the liquid mixture output by the mixing chamber has a variable fat content between the fat content of the reduced fat dairy product and the fat content of the whole fat dairy product based on a proportion of the first liquid to the second liquid.

12. An apparatus for providing a beverage, comprising:
a beverage container region for accommodating a beverage container;
a brewing chamber configured to receive coffee grounds and water and to dispense brewed coffee into the beverage container region;
a heating element configured to heat a liquid;
a frothing head configured to froth a liquid;
a first liquid channel couplable to a first liquid storage containing a first liquid, the first liquid channel being in operative connection with a first pump and in fluid communication with the heating element and the frothing head for dispensing a first variable proportion of the first liquid to a second liquid through the heating element and the frothing head into the beverage container region; and
a second liquid channel couplable to a second liquid storage containing a second liquid, the second liquid channel being in operative connection with a second pump and in fluid communication with the heating element and the frothing head for dispensing a second variable proportion of the second liquid to the first liquid through the heating element and the frothing head into the beverage container region;
an input device for receiving instructions, thereby specifying first pump instructions for pumping of the first variable proportion the first liquid by the first pump and second pump instructions for pumping of the second variable proportion of second liquid in accordance with a desired fat content of a resulting liquid mixture;
wherein the first liquid and the second liquid are combined in accordance with the first pump instructions and the second pump instructions in the respective variable proportions to form the liquid mixture having the desired fat content.

\* \* \* \* \*